United States Patent
Bethke et al.

(10) Patent No.: US 7,086,289 B2
(45) Date of Patent: Aug. 8, 2006

(54) ARRANGEMENT FOR MEASURING A PRESSURE IN A FLUID OR GASEOUS MEDIUM

(75) Inventors: Jürgen Bethke, Regensburg (DE); Georg Fischer, Reifenthal (DE); Georg Mentzel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 28 days.

(21) Appl. No.: 10/761,948

(22) Filed: Jan. 21, 2004

(65) Prior Publication Data

US 2004/0163474 A1 Aug. 26, 2004

(30) Foreign Application Priority Data

Jan. 27, 2003 (DE) .................. 103 03 078

(51) Int. Cl.
*G01L 9/06* (2006.01)
(52) U.S. Cl. ........................................................ 73/721
(58) Field of Classification Search .............. 73/721, 73/700, 118.1, 724, 718
See application file for complete search history.

(56) References Cited

U.S. PATENT DOCUMENTS

| 5,987,996 | A |   | 11/1999 | Kim et al. ............... 73/756 |
| 6,003,381 | A | * | 12/1999 | Kato ........................ 73/721 |
| 6,131,468 | A |   | 10/2000 | Sich et al. ............... 73/756 |
| 2001/0011478 | A1 | * | 8/2001 | Albert et al. ............ 73/431 |
| 2001/0018380 | A1 | * | 8/2001 | Fritzsche et al. ....... 475/116 |
| 2002/0062714 | A1 | * | 5/2002 | Albert et al. .......... 74/606 R |

FOREIGN PATENT DOCUMENTS

| DE | 297 14 229 U1 | 1/1998 |
| DE | 195 17 676 A1 | 11/1998 |
| DE | 198 34 212 A1 | 2/2000 |

* cited by examiner

Primary Examiner—Edward Lefkowitz
Assistant Examiner—Andre Allen
(74) Attorney, Agent, or Firm—Baker Botts L.L.P.

(57) ABSTRACT

A pressure sensor (3) is firmly connected to a base plate (1). The base plate (1) can be mounted, together with the pressure sensor (3), on a counterplate (7). The counterplate (7) has a drilled hole (8) through which pressure can be applied to the pressure sensor (3). The pressure sensor (3) has a connecting element (6) which projects, in the mounted state, into the drilled hole (8) in the counterplate (7).

13 Claims, 2 Drawing Sheets

ARRANGEMENT FOR MEASURING A PRESSURE IN A FLUID OR GASEOUS MEDIUM

PRIORITY

This application claims foreign priority of the German application DE 10303078.6 filed on Jan. 27, 2003.

TECHNICAL FIELD OF THE INVENTION

The present invention relates to an arrangement for measuring a pressure in a fluid or gaseous medium.

DESCRIPTION OF THE RELATED ART

In modem automatic transmissions in motor vehicles, electronic components for transmission control are increasingly integrated into the transmission. The motivation for this is the higher degree of reliability and the lower costs of this design, which is based on eliminating electrical and mechanical connections.

In the previously customary design of automatic transmissions, the actuators which are required for transmission control, such as electrohydraulic pressure actuators, and sensors, for example for sensing the rotational speed, pressure, position of the gear shift lever, temperature of the transmission oil etc., were located in or on the transmission, where they were installed independently of one another. The electronic controller of the transmission which is installed outside the transmission and remotely therefrom was then connected to the actuators and sensors via cables and plug-type connectors. Complex individual couplings between the inputs and outputs of the controller and the corresponding actuators and sensors were therefore produced.

In a mechatronic transmission arrangement, the actual electronic controller, which generally contains a microcontroller and corresponding memories, and the sensors for sensing essential states and parameters of the transmission are now installed together in one housing. This mechatronic module is then mounted in the transmission housing when the transmission is assembled, as a result of which the connecting operations between the sensors and transmission controller which were mentioned at the beginning are dispensed with. At least one pressure sensor, which has the purpose of measuring the hydraulic pressure in the transmission, is frequently arranged in the mechatronic module.

A known transmission controller for a motor vehicle has a base plate which is arranged in a transmission housing and has a drilled hole in which a sensor housing is fastened plugged in with a formed-on projection (DE 297 14 229 U1). A pressure-tight connection between the housing and the base plate is made by bonding, soldering, welding or the like. A sealing element in the form of an O ring is held clamped in an end-side, undercut groove at the end of the housing projection, said ring bringing about sealing against the corresponding abutment on a counterplate, in this case against the transmission housing, after mounting.

A similar arrangement is also known from the document DE 198 34 212 A1. The control unit—described therein—in a motor vehicle has a metallic base plate, referred to in said document as a bottom plate, which is provided with a drilled hole. The carrier of a pressure sensor is pressed into this drilled hole in such a way that a pressure-tight connection between the carrier and the bottom plate is formed through displacement of material. A pressure sensor, to which pressure is applied via the drilled hole, is fastened on the carrier. The bottom plate is firmly connected to a counterplate, in this specific case to the hydraulic unit of a transmission. A sealing element in the form of an O ring is provided between the hydraulic unit and the underside of the bottom plate in order to ensure a pressure-tight connection between the bottom plate and the hydraulic unit.

However, due to fabrication tolerances there is frequently an air gap between the base plate and the counterplate in such arrangements despite the sealing elements. This air gap has an adverse effect on the tightness of the junction between the counterplate and base plate in the region of the drilled holes through which pressure is applied to the pressure sensor. As a result, it is possible, for example, for gap extrusion of the sealing element to occur.

The positioning of the mechatronic module plays a decisive role for reliable and fault-free operation of, for example, a transmission. For example, the positioning of sensors which sense the position of a displaceable transmission part, such as for example of the gear shift lever which can be actuated manually by the driver or of the hydraulic manual switching valve of the transmission, is decisive for the precision of the sensing of position. In order to ensure that the mechatronic module is mounted in an accurately positioned fashion, it is customary nowadays in commercial practice to use centering pins, for example in the form of metal pins which are fabricated to a form fit, which are introduced in specially provided guiding holes in the base plate and the counterplate.

SUMMARY OF THE INVENTION

The invention is based on the object of specifying an arrangement for measuring a pressure in a fluid or gaseous medium, which simplifies mounting a base plate, on which at least one pressure sensor is fastened, on a counterplate in an accurately positioned fashion, and at the same time ensures an improved seal between the base plate and the counterplate in the region of the drilled holes through which pressure is applied to the pressure sensor.

This object can be achieved according to the invention by an arrangement for measuring a pressure in a fluid or gaseous medium, comprising a base plate, at least one pressure sensor, which is connected to the base plate, and a counterplate, on which the base plate with the pressure sensor or sensors can be mounted, and which has drilled holes through which pressure can be applied to the pressure sensor or sensors, wherein precisely one pressure sensor has a connecting element which projects, in the mounted state, into one of the drilled holes in the counterplate.

A sealing element can be provided on the connecting element, in the region which is located in the drilled hole in the counterplate after mounting. At least one further electronic component can be arranged on the base plate. At least parts of a control circuit for a motor vehicle transmission can be arranged on the base plate. A centering pin can be provided which is pressed into the base plate or the counterplate to a form fit, and is introduced into a guide hole of the respective other plate. The guide hole can be embodied as an elongated hole. The pressure sensor can be a piezoelectric sensor. The base plate may be composed of a metal or of plastic. The piezoelectric sensor can be arranged on a carrier. The carrier can be firmly connected to the base plate by bonding, soldering, or welding. The further electronic component can be an amplifier.

The object can also be achieved by a method for measuring a pressure in a fluid or gaseous medium, comprising the steps of:

connecting at least one pressure sensor to a base plate, mounting a counterplate on the base plate with the pressure sensor or sensors, wherein the counterplate comprises at least one drilled hole into which a connecting element of precisely one pressure sensor projects, and applying a pressure through said drilled hole to the pressure sensor or sensors.

The method may further comprise the step of sealing the connecting element, in the region which is located in the drilled hole in the counterplate. The method may also further comprise the step of aligning the base plate and the counterplate through a centering pin which is pressed into the base plate or the counterplate to a form fit, and is introduced into a guide hole of the respective other plate. The guide hole can be embodied as an elongated hole.

A pressure sensor is firmly connected to a base plate, for example pressed in, bonded, soldered, welded, riveted, caulked or screwed. The base plate can be mounted, together with the pressure sensor, on a counterplate. The counterplate has a drilled hole through which pressure can be applied to the pressure sensor. According to the invention, the pressure sensor has a connecting element which projects, in the mounted state, into the drilled hole in the counterplate. The connecting element acts here, as a result of its penetration into the counterplate, as a centering pin so that it is ensured, without additional expenditure, that the base plate is mounted on the counterplate in an accurately positioned fashion. Furthermore, the penetration of the connecting element into the drilled hole in the counterplate improves the seal of the arrangement in this region significantly.

The arrangement according to the invention can be applied exclusively to systems which have precisely one pressure sensor with such a connecting element. Otherwise, the problem of overspecification of the system occurs. If further pressure sensors are arranged on the base plate, it is necessary to ensure that they do not have any such connecting element, but rather are, for example, of a design such as is known from the documents described at the beginning.

A sealing element, for example in the form of an O ring, can advantageously be provided on the connecting element in the region which is located in the drilled hole of the counterplate after mounting, said element further improving the radial seal between the connecting element and the inner wall of the drilled hole.

In one preferred exemplary embodiment of the invention, not only the pressure sensor but also at least one further electronic component are arranged on the base plate. However, it is also possible to arrange at least parts of a complete control circuit, for example for a motor vehicle transmission, on the base plate. The arrangement can be used advantageously in particular if at least one of the further electronic components on the base plate is a component which brings about positionally accurate mounting of the base plate on the counterplate, for example a rotational speed sensor.

BRIEF DESCRIPTION OF THE DRAWINGS

An exemplary embodiment of the invention will be explained below with reference to the drawings, in which.

DETAILED DESCRIPTION OF THE PREFERRED EMBODIMENTS

Figure 1:
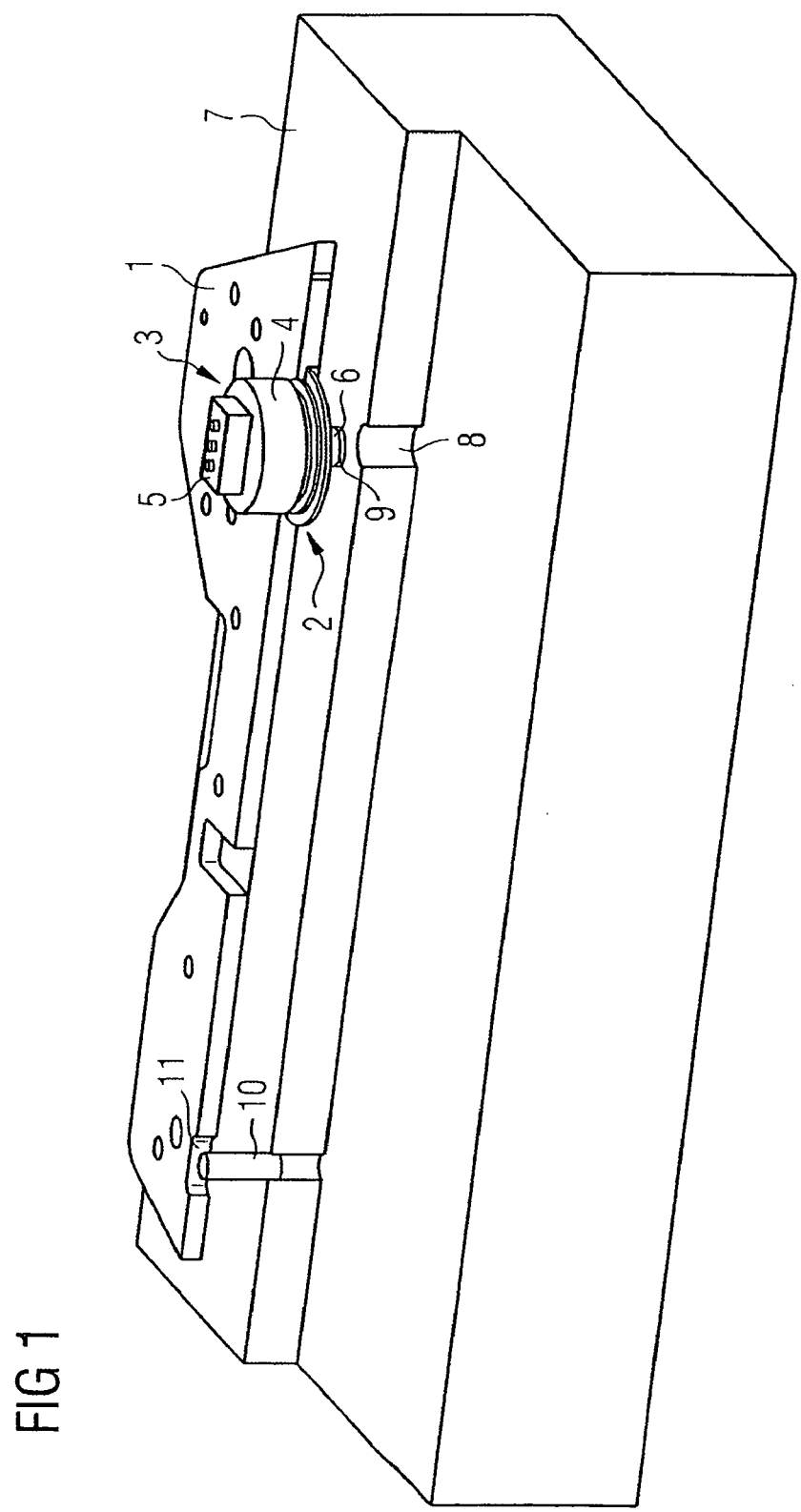
FIG. 1 shows a schematic view of an arrangement according to the invention before the base plate is mounted on the counterplate.
Figure 2:
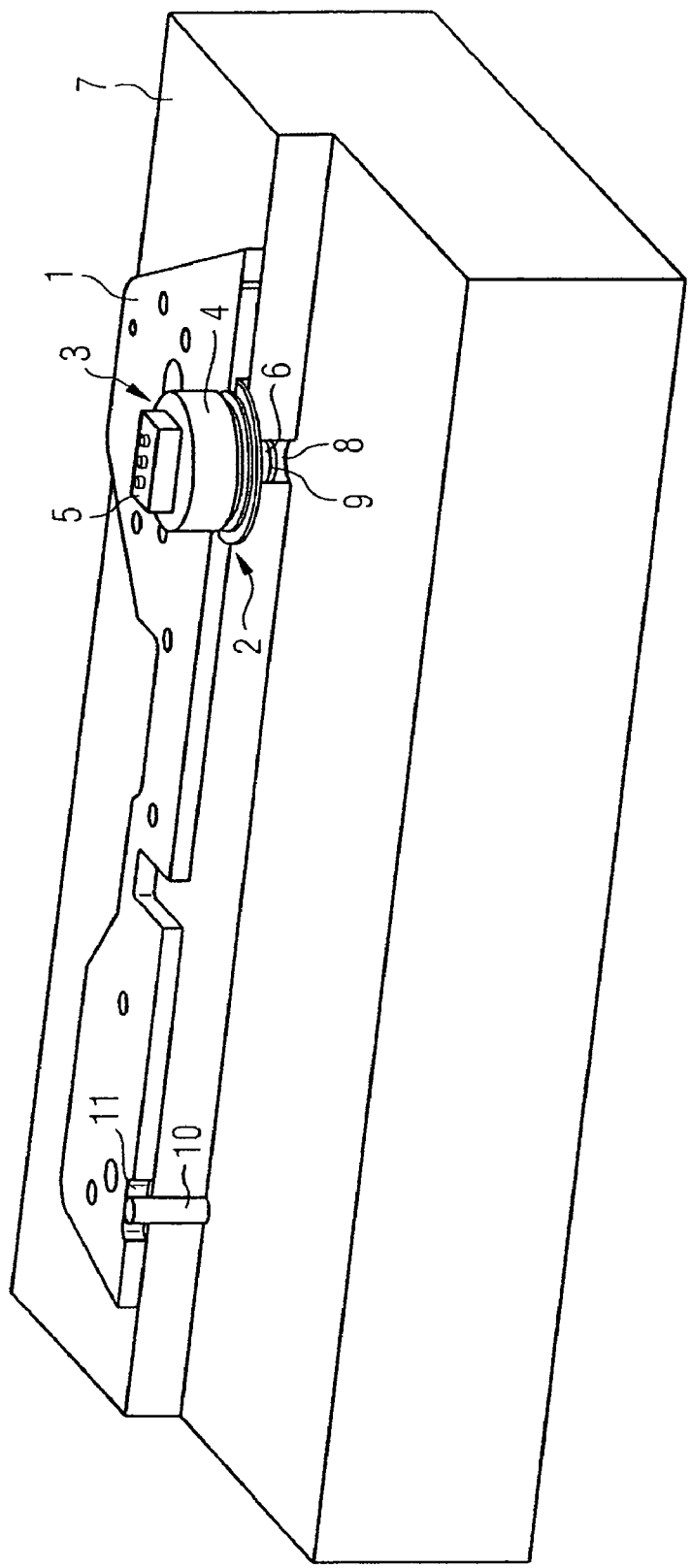
FIG. 2 is a schematic illustration of the arrangement according to FIG. 1 after the base plate has been mounted on the counterplate.

A base plate 1 which is composed of a metal or of plastic accommodates a pressure sensor 3 in the region of a drilled hole 2. The pressure sensor 3 has here a sensor element (not illustrated) which is designed, for example, as a piezoresistive pressure sensor element which is known per se and which is arranged on a carrier 4. The carrier 4 may also be a component of an enclosed sensor housing. A housed sensor design is illustrated in FIGS. 1 and 2 by way of example, but it is also possible to use sensor designs such as are known, for example, from the documents DE 297 14 229 U1 and DE 198 34 212 A1 which were mentioned at the beginning, in which the sensor element is not surrounded by an enclosed housing. In the figures, by way of example, a pressure sensor 3 is illustrated which is equipped with a plug part 5 for the purpose of making electrical contact. However, it is also possible, without influencing the invention, to use sensor designs which have different contacting means, for example bond pads.

The carrier 4 is firmly connected to the base plate 1. The carrier 4 can have, as indicated in FIGS. 1 and 2, for example a cylinder-like projection which is pressed into the drilled hole 2 in the base plate 1 in such a way that a pressure-tight and frictionally locking connection is formed between the carrier 4 and the base plate 1 by displacement of material. However, the carrier 4 can also be firmly connected to the base plate 1 by bonding, soldering, welding or the like.

Apart from the pressure sensor 3, further electronic components or assemblies (not illustrated) may also be arranged on the base plate 1. For example, a signal amplification or evaluation circuit for the pressure sensor, or else a complete control circuit, for example for a transmission controller, can be accommodated on the base plate 1.

The carrier 4 of the pressure sensor 3 has a connecting element 6, for example in the form of a hollow cylinder, which is introduced into a drilled hole 8 in the counterplate 7 when the base plate 1 is mounted on a counterplate 7. The drilled hole 8 is used here as a pressure duct via which the medium under pressure, for example the hydraulic fluid in a motor vehicle transmission, is later applied to the pressure sensor 3. An O ring 9 for radially sealing the connecting element 6 with respect to the inner wall of the drilled hole 8 is provided on the connecting element 6, in the region which is located in the drilled hole 8 of the counterplate 7 after mounting. As a result of the connecting element 6 penetrating the drilled hole 8 of the counterplate 7, a seal which is considerably improved in comparison to the prior art is obtained. A gap extrusion of the O ring 9 is thus effectively prevented.

Furthermore, the connecting element 6 acts, as a result of its penetration into the counterplate 7, as a centering pin so that it is ensured that the base plate 1 is mounted on the counterplate 7 in an accurately positioned fashion. In addition, a "genuine" centering pin 10, for example in the form of a metal pin, is advantageously provided, said pin being pressed into one of the two plates 1 or 7 to a form fit before the base plate 1 is mounted on the counterplate 7, and being introduced into a guide hole 11 on the respective other plate during mounting. In order to avoid mechanical overspecification of the arrangement, the guide hole 11 is embodied here as an elongated hole. For example, FIG. 1 illustrates a centering pin which is fastened in the counterplate 7. An elongated hole is accordingly provided as a guide hole 11 in the base plate 1. In any case, the arrangement according to the invention allows a centering pin to be dispensed with, making the manufacture of the arrangement simpler and more cost-effective.

The invention claimed is:

1. An arrangement for measuring a pressure in a fluid or gaseous medium, comprising:
    a base plate,
    at least one pressure sensor, which is connected to the base plate, and
    a counterplate, on which the base plate with the pressure sensor or sensors can be mounted, and which has drilled holes through which pressure can be applied to the pressure sensor or sensors,
    the at least one pressure sensor having a connecting element which projects, in the mounted state, into one of the drilled holes in the counterplate, and
    a centering pin pressed into the base plate or the counterplate to a form fit, and is introduced into a guide hole of the respective other plate.

2. The arrangement as claimed in claim 1, wherein a sealing element is provided on the connecting element, in the region which is located in the drilled hole in the counterplate after mounting.

3. The arrangement as claimed in claim 1, wherein at least one further electronic component is arranged on the base plate.

4. The arrangement as claimed in claim 3, wherein at least parts of a control circuit for a motor vehicle transmission are arranged on the base plate.

5. The arrangement as claimed in claim 1, wherein the guide hole is embodied as an elongated hole.

6. The arrangement as claimed in claim 1, wherein the pressure sensor is a piezo-electric sensor.

7. The arrangement as claimed in claim 1, wherein the base plate is composed of a material selected from the group consisting of metal and plastic.

8. The arrangement as claimed in claim 6, wherein the piezoelectric sensor is arranged on a carrier.

9. The arrangement as claimed in claim 8, wherein the carrier is firmly connected to the base plate by a connection process selecting from the group of processes consisting of bonding, soldering, and welding.

10. The arrangement as claimed in claim 3, wherein the further electronic component is an amplifier.

11. A method for measuring a pressure in a fluid or gaseous medium, comprising the steps of:
    connecting at least one pressure sensor to a base plate,
    mounting a counterplate on the base plate with the at least one pressure sensor, wherein the counterplate comprises at least one drilled hole into which a connecting element of the at least one pressure sensor projects, and
    applying a pressure through said drilled hole to the at least one pressure sensor,
    aligning the base plate and the counterplate through a centering pin pressed into the base plate or the counterplate to a form fit, and
    introducing the centering pin into a guide hole of the respective other plate.

12. A method according to claim 11, further comprising the step of sealing the connecting element, in the region of the drilled hole in the counterplate.

13. A method according to claim 11, wherein the guide hole is an elongated hole.

* * * * *